United States Patent [19]
Forrest, Jr.

[11] Patent Number: 5,041,954
[45] Date of Patent: Aug. 20, 1991

[54] IDENTIFICATION INSPECTION DEVICE

[75] Inventor: Robert S. Forrest, Jr., Lowell, Mich.

[73] Assignee: Forrest Products, Inc., Lowell, Mich.

[21] Appl. No.: 510,668

[22] Filed: Apr. 18, 1990

[51] Int. Cl.$^5$ ............................................. F21V 33/00
[52] U.S. Cl. ..................................... 362/234; 362/99;
362/154; 362/253; 362/125
[58] Field of Search ............... 362/125, 154, 268, 331,
362/375, 99, 234, 253; 283/85; 250/329

[56] References Cited

U.S. PATENT DOCUMENTS

| | | | |
|---|---|---|---|
| 1,891,498 | 12/1932 | Borden | 362/125 X |
| 2,000,537 | 5/1935 | Ransom | 362/125 X |
| 3,162,378 | 12/1964 | Zillmer | 362/373 X |
| 3,699,327 | 10/1972 | Fagan | 362/268 X |
| 4,236,192 | 11/1980 | Duggan | 362/16 X |
| 4,519,020 | 5/1985 | Little | 362/331 X |
| 4,677,531 | 6/1987 | Szeles | 362/293 X |

Primary Examiner—Stephen F. Husar
Attorney, Agent, or Firm—Warner, Norcross & Judd

[57] ABSTRACT

An identification inspection device includes a housing defining an enclosure, a chute defining a slot for receiving an identification card into the enclosure, a lighting system for illuminating the card, and a lens for viewing the card. The lens includes a magnifying lens to enhance the inspection of the identification card. The lighting system includes white light, and optionally ultraviolet light, to illuminate the card. The white light permits easy reading of the printed information supplied on the card. The ultraviolet light highlights tampered areas not readily visible in conventional white light.

20 Claims, 3 Drawing Sheets

IDENTIFICATION INSPECTION DEVICE

BACKGROUND OF THE INVENTION

The present invention pertains to an identification device which is especially suited for the examination of identification cards, such as drivers' licenses.

The examination of identification cards (IDs) is required by many diverse groups. For instance, several types of establishments have minimum age requirements. At a tavern or pub, an employee may be required to check IDs to ascertain whether the patrons meet the legal minimum age. Additionally, police officers will also frequently have need to examine IDs. In either of these situations, the lighting will often be poor, thus making the small print of the cards extremely difficult to read.

Further, IDs are at times illegally altered so that the name, address and/or date of birth are changed. Detection of such alterations is difficult even in well lighted environments.

SUMMARY OF THE INVENTION

The identification inspection device of the present invention overcomes the aforementioned problems. The device includes a housing which defines an enclosure, a chute for receiving the ID to be inspected, a window portion through which the ID may be viewed, and a lighting system for illuminating the ID. This construction enables the ID to be easily viewed, without straining to see the printed information, trying to tilt the card to catch the best light, or employing additional lighting means such as a flashlight. Moreover, the lighting is provided discretely to avoid disrupting the viewer's "night vision."

In a preferred embodiment, ultraviolet light is directed on the ID to highlight altered areas on the surface of the ID. The preferred unit therefore assists in detecting tampered IDs.

These and other objects, advantages, and features of the present invention will be more fully understood and appreciated by reference to the written specification and appended drawings.

DETAILED DESCRIPTION OF THE PREFERRED EMBODIMENT

Figure 1:
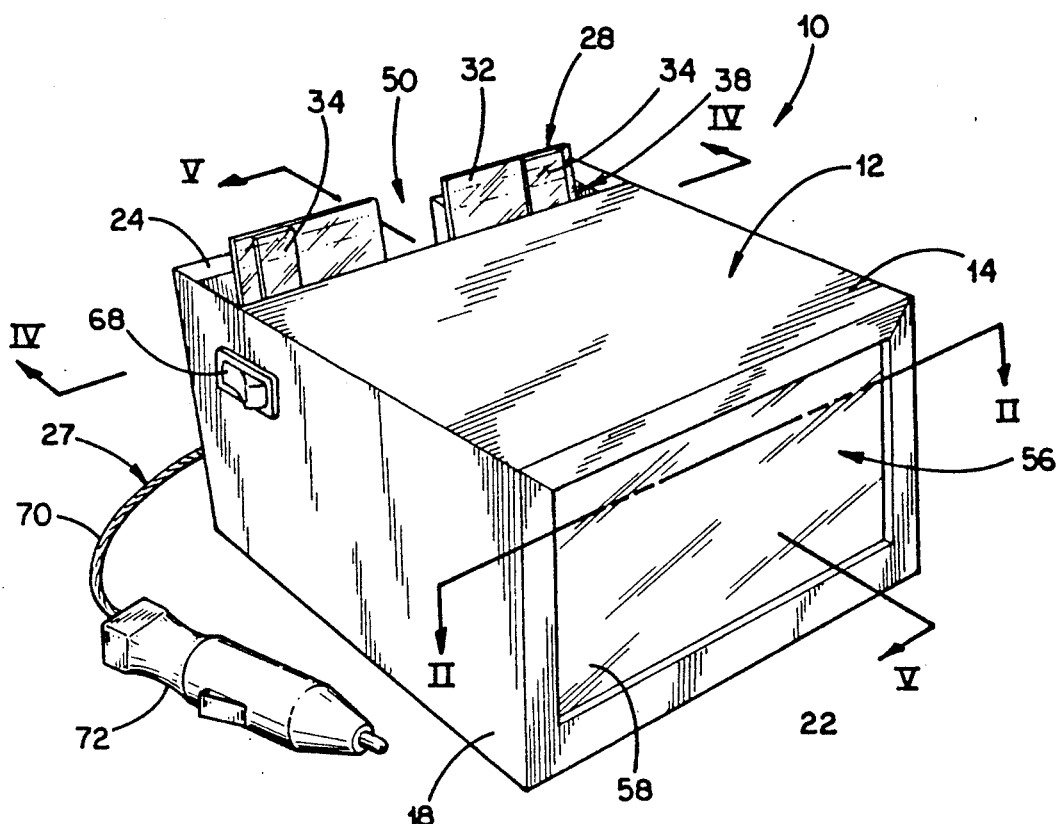
FIG. 1 is a perspective view of the present invention.

In the preferred embodiment, an inspection device 10 (FIG. 1) is provided to facilitate the easy inspection of an identification card (ID), irrespective of the amount of available lighting. Inspection device 10 includes a housing 12 having top and bottom walls 14, 16, a pair of side walls 18, 20, and front and rear walls 22, 24, which collectively define an enclosure 26. The defined enclosure is illuminated by a lighting system 27. In general, the ID is received within the illuminated enclosure for viewing.

A chute 28 (FIGS. 1-5) is provided to receive an ID in enclosure 26 for inspection. More specifically, chute 28 is comprised of front and rear plates 30, 32 fixedly secured together in a spaced apart relationship by spacers 34. Plates 30, 32 and spacers 34 cooperatively define a slot 36 (FIGS. 2-5) dimensioned to receive most common IDs. Chute 28 is positioned adjacent rear wall 24 to extend from bottom wall 16 to a short distance above top wall 14.

Figure 3:
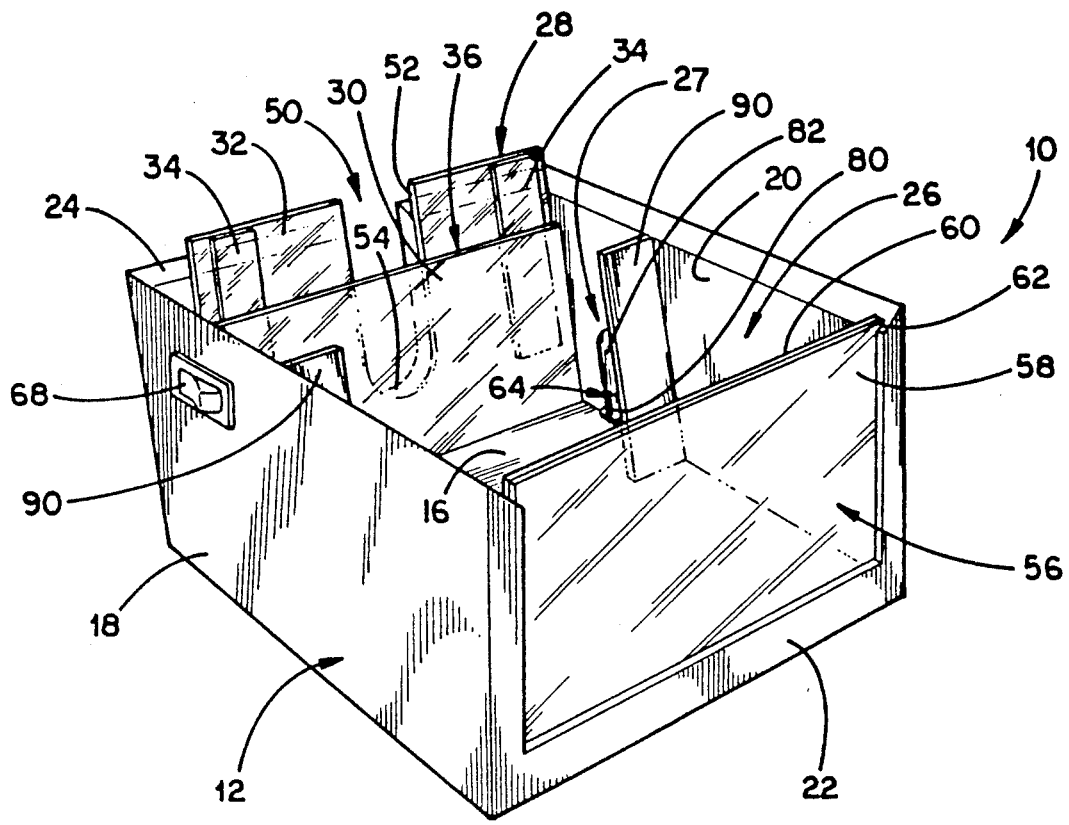
FIG. 3 is a perspective view of the present invention with the top wall of the housing omitted.
Figure 4:
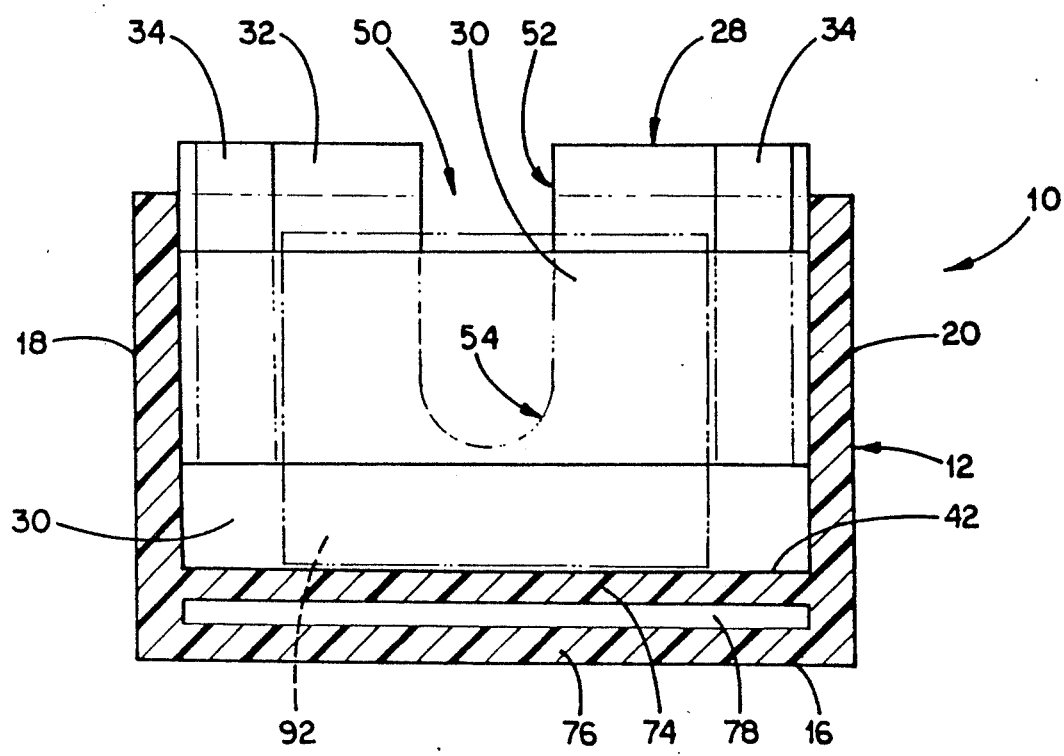
FIG. 4 is a cross-sectional view taken along line IV—IV in FIG. 1.
Figure 5:
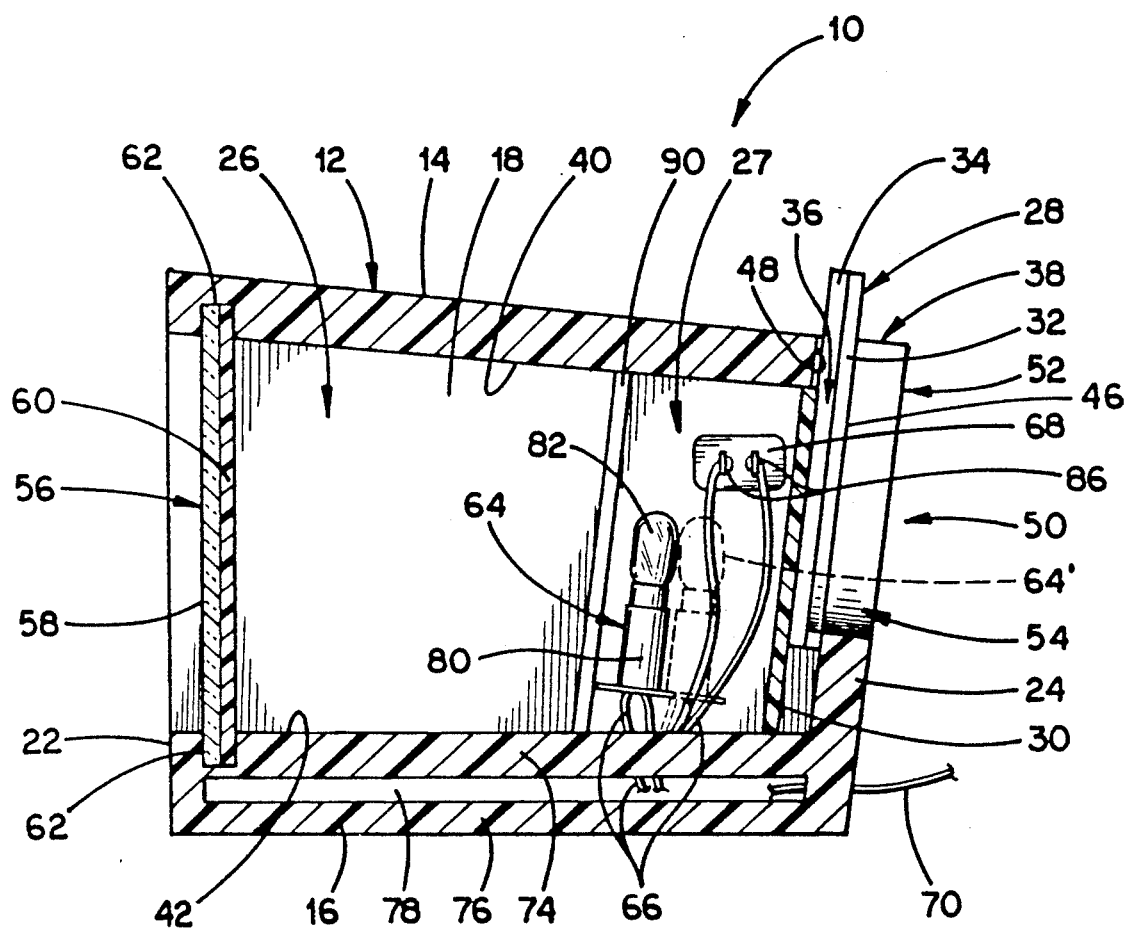
FIG. 5 is a cross-sectional view taken along line V—V in FIG. 1.

Housing 12 defines an opening 38 (FIGS. 1 and 5) at the juncture of the top and rear walls 14, 24 to permit the extension of chute 28 and the passage of IDs into enclosure 26. Front plate 30 is a transparent planar member that extends completely between the inner surfaces 40, 42 of the top and bottom walls 14, 16 (FIGS. 3-5). Rear plate 32 and spacers 34 extend from a position above top wall 14 to a location spaced above surface 42. The rear face 46 of plate 32 is adhered to rear wall 24 by a conventional pressure sensitive adhesive. With this construction, slot 36 is defined: by rear plate 32 and the back edge 48 of top wall 14 along its top portion; by plates 30, 32 through its middle section; and by rear wall 24 and plate 30 along its bottom portion. Of course, plates 30, 32 could each extend the entire length of chute 28.

A gap 50 is defined through rear wall 24 and rear plate 32, to accommodate removal of the ID from the enclosure. Gap 50 is an elongated opening having an open upper end 52 and a closed lower end 54. The position of the lower end extends at least half way along rear wall 24 so that a significant portion of an inserted ID overlies the gap. Further, gap 50 is provided with a width dimension sufficient to permit ingress of a user's finger. Hence, to remove an ID, a user reaches through gap 50 to engage the ID in slot 36. The ID may then be slid upwardly through slot 36, to the top of chute 28, for removal.

Due to the illumination provided by lighting system 27, discussed further below, chute 34 is oriented at an inclination to reduce glare on plate 30. Preferably, plate 30 is placed at an angle of eight degrees to a vertical plane. Rear wall 24, then, is also oriented at an inclination of eight degrees to a vertical plane in the preferred construction, because of the direct attachment of plate 32 thereto. Of course, rear wall 24 and/or chute could be oriented vertically with less desirable glare reduction.

Figure 2:
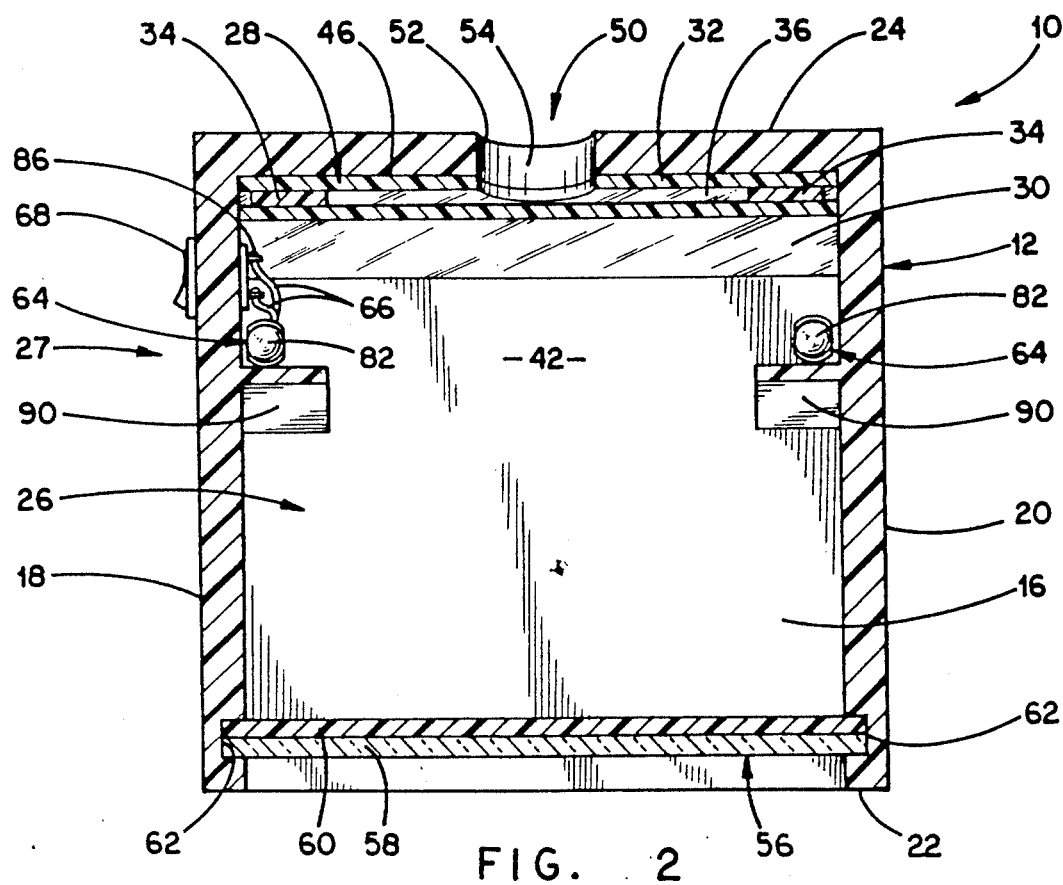
FIG. 2 is a cross-sectional view taken along line II—II in FIG. 1.

A window portion 56, defined in front wall 22, permits a user to view an identification card supported within the enclosure 26 (FIGS. 1-3 and 5). Window portion 56 includes a front transparent panel 58 and a magnifying panel 60. Magnifying panel 60 may be a Fresnel lens or other type of magnifying element. These two panels 58, 60 are placed in abutting relation with one another in a peripheral channel 62 defined in side walls 18, 20, top wall 14, and bottom wall 16 (FIGS. 2-3 and 5). Of course, any type of mounting arrangement could be used.

Enclosure 26 is illuminated through the use of a lighting system 27. More specifically, lighting system 27 includes: a pair of light fixtures 64 positioned adjacent side walls 18, 20; wiring 66; switch 68; cord 70; and electrical connector 72. Electrical connector 72 may be shaped for connection to an automotive cigarette lighter (as shown in FIG. 1) or be a conventional plug for use in a wall outlet (not shown).

To accommodate wiring 66, bottom wall 16 is preferably a split member comprised of an upper member 74 and a lower member 76 (FIGS. 4 and 5). Upper and lower members 74, 76 are spaced apart to define a narrow space 78 within which the wiring 66 is located. Each light fixture 64 includes a socket 80 and lamp 82 assembly that is attached to upper member 74. The wires 66 extend through bores (not shown) in upper member 74. Additionally, the wiring 66 also passes through one of the bores for attachment to terminals 86 of switch 68. Switch 68 is a conventional single-pole, rocker switch. Cord 70 is also received in space 78 through a bore (not shown) defined in rear wall 24.

Blocking strips 90 (FIGS. 2, 3, and 5) are narrow strips which are positioned between lamps 82 and window 56. Strips 90 function to block the light from shining directly into window 56 and impairing the night vision of the viewer. In the preferred embodiment, the lamps 82 and strips 90 are placed at an inclination, such that they are substantially parallel with plate 30 of chute 28 (see FIG. 5). Strips 90 and lamps 82, however, may be placed at any orientation.

Lamps 82 are both conventional white light bulbs. The lamps illuminate the identification card 92 (FIG. 4) received within chute 28 for inspection by a viewer looking through window portion 56. The white light illuminates the printed material on the ID for easy reading.

Alternatively, white and ultraviolet lighting may both be provided in light fixtures adjacent one another 64, 64' (FIG. 5) so that the device 10 can be used in either mode. In this embodiment, the ultraviolet bulbs remain continually powered; and the switch 68 is spring-loaded and connected only to the white light bulbs. The ultraviolet light is used to identify any area which has been altered. As discussed above, the ultraviolet light highlights portions which have been tampered, but yet may not be apparent under conventional white light. The white light is activated as necessary to illuminate the printed information.

The above descriptions are those of preferred embodiments of the invention. Various alterations and changes can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. An identification inspection device for inspecting a surface of an identification card, said device comprising:
   a housing defining an enclosure and a window portion for permitting visual access into said enclosure;
   holding means for receiving a card into said enclosure and for holding the card so that its surface can be directly seen through said window portion; and
   lighting means provided within said enclosure for illuminating the surface of the card, whereby the surface of the card can be directly and easily seen and inspected.

2. A device as defined in claim 1 further including a lens means secured in said window portion for magnifying the card to facilitate its easy inspection.

3. A device as defined in claim 2 in which said lighting means includes ultraviolet lighting for highlighting any altered portions of the card.

4. A device as defined in claim 3 in which said holding means and said housing cooperatively define an opening by which the card can be manually engaged and removed from said enclosure.

5. A device as defined in claim 2 wherein said lens means includes a transparent panel and a magnifying panel arranged contiguously with each other.

6. A device as defined in claim 2 in which said holding means defines a slot dimensioned to receive and hold the card in said enclosure, wherein said slot is oriented in a non-parallel relationship with said lens means.

7. A device as defined in claim 6 in which said holding means and said housing cooperatively define an opening by which the card can be manually engaged and removed from said enclosure.

8. A device as defined in claim 1 in which said holding means and said housing cooperatively define an opening by which the card can be manually engaged and removed from said enclosure.

9. A device as defined in claim 8 further including means for blocking the light of said lighting means from shining directly out said window portion.

10. A device as defined in claim 1 in which said lighting means includes ultraviolet lighting for highlighting any altered portions of a card.

11. A device as defined in claim 1 in which said lighting means includes a source of white light and a source of ultraviolet light, so that the card can be easily read under the white light and inspected for alterations under the ultraviolet light.

12. An identification inspection device comprising:
   a housing defining a window portion permitting direct visual access into said housing;
   a chute defining a slot adapted to pass an identification card into said housing and hold the card in said housing for direct viewing of a surface of the card through said window portion;
   a lens structure secured in said window portion for magnifying a card held in said housing; and
   a lighting assembly mounted within said housing to illuminate the surace of the card held therein.

13. A device as defined in claim 12 wherein said lighting assembly includes ultraviolet lighting.

14. A device as defined in claim 12 wherein said lighting assembly includes white lighting and ultraviolet lighting, and wherein said lighting assembly has the capacity to illuminate the card with white light to enable the card to be easily read and alternatively to illuminate the card with ultraviolet light to enable any alterations on the card to be seen.

15. A device as defined in claim 12 wherein said chute and said housing cooperatively define an opening by which the card can be manually engaged and removed from the slot.

16. A device as defined in claim 12 wherein said slot is positioned in an inclined orientation relative to said lens structure.

17. A device as defined in claim 12 wherein said lens structure includes a magnifying panel and a transparent panel placed in abutting relation with each other.

18. A device for inspecting surfaces of personal identification cards, said device comprising:
   a housing having a top, a bottom, and two opposed sides defining a chamber having front and back ends;
   a chute means extending into said back end of said chamber for receiving an identification card and holding the card within said chamber in fixed relationship to said front and rear ends;

lens means within said front end of said chamber for directly viewing said chute means and a card held within said chute means, said lens means including magnifying means for magnifying the held card;

light source means intermediate said lens means and said chute means for illuminating the chute means and a card held within said chute means, said light source means being adjacent to at least one of said sides so as to provide unrestricted direct viewing of a surace of the held card through said lens means; and shade means adjacent said light source means and said at least one side for blocking direct viewing of said light source means through said lens means.

19. A device as defined in claim 18 wherein said light source means includes:

white light source means for illuminating a card held within said chute means with white light;

ultraviolet light source means for illuminating the held card with ultraviolet light; and switch means for switching said white light source means on and off.

20. A device as defined in claim 19 wherein said chute means is inclined from said lens means to reduce glare from the held card.

* * * * *

UNITED STATES PATENT AND TRADEMARK OFFICE
CERTIFICATE OF CORRECTION

PATENT NO. : 5,041,954

DATED : August 20, 1991

INVENTOR(S) : Forrest, Jr.

It is certified that error appears in the above-identified patent and that said Letters Patent is hereby corrected as shown below:

Column 4, Claim 12, Line 42:
    "surace" should be --surface--

Column 4, Claim 18, Line 67:
    delete "a" before "chute"

Column 5, Claim 18, Line 14:
    "surace" should be --surface--

Signed and Sealed this

Twenty-sixth Day of January, 1993

Attest:

STEPHEN G. KUNIN

Attesting Officer

Acting Commissioner of Patents and Trademarks